Sept. 22, 1959 E. T. PLATZ 2,905,795
INDICATOR STRUCTURE FOR CIRCUIT BREAKERS
Filed Dec. 30, 1957 5 Sheets-Sheet 1

INVENTOR.
ELWOOD T. PLATZ
BY
ATTORNEYS

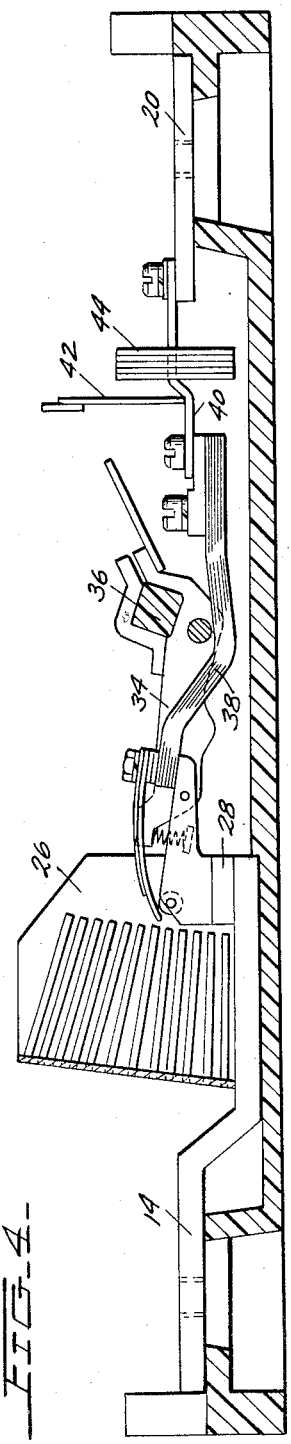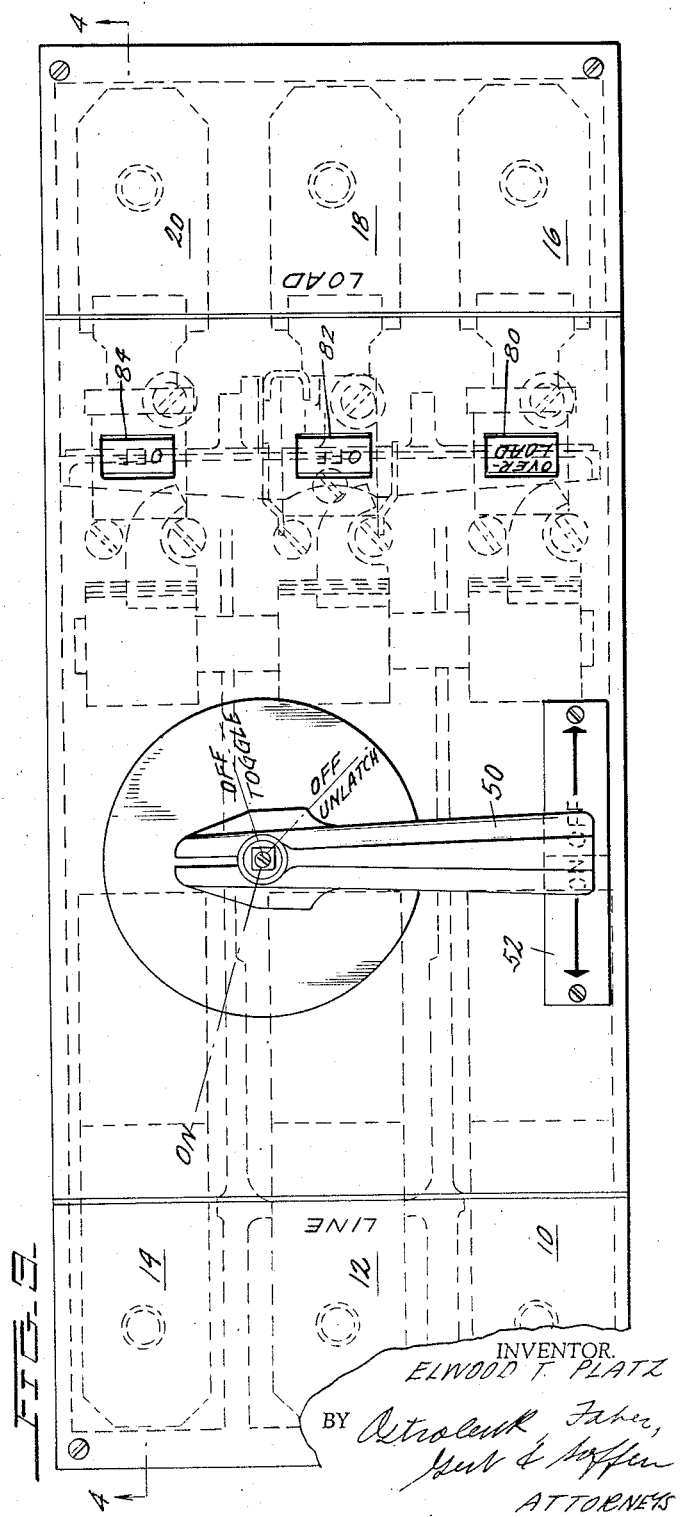

Sept. 22, 1959 E. T. PLATZ 2,905,795
INDICATOR STRUCTURE FOR CIRCUIT BREAKERS
Filed Dec. 30, 1957 5 Sheets-Sheet 3
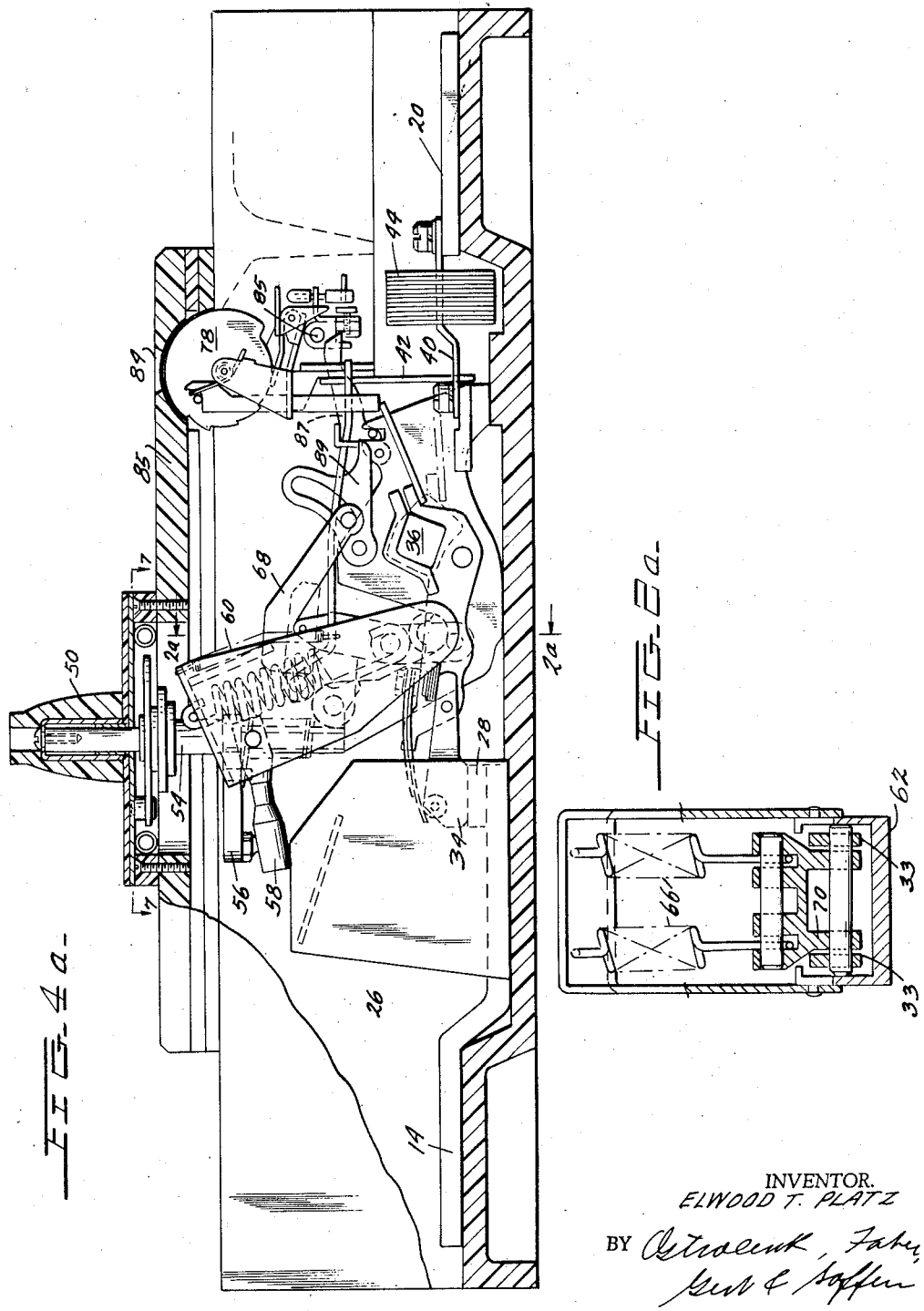
INVENTOR.
ELWOOD T. PLATZ
BY
ATTORNEYS Sept. 22, 1959        E. T. PLATZ        2,905,795
INDICATOR STRUCTURE FOR CIRCUIT BREAKERS
Filed Dec. 30, 1957        5 Sheets-Sheet 4
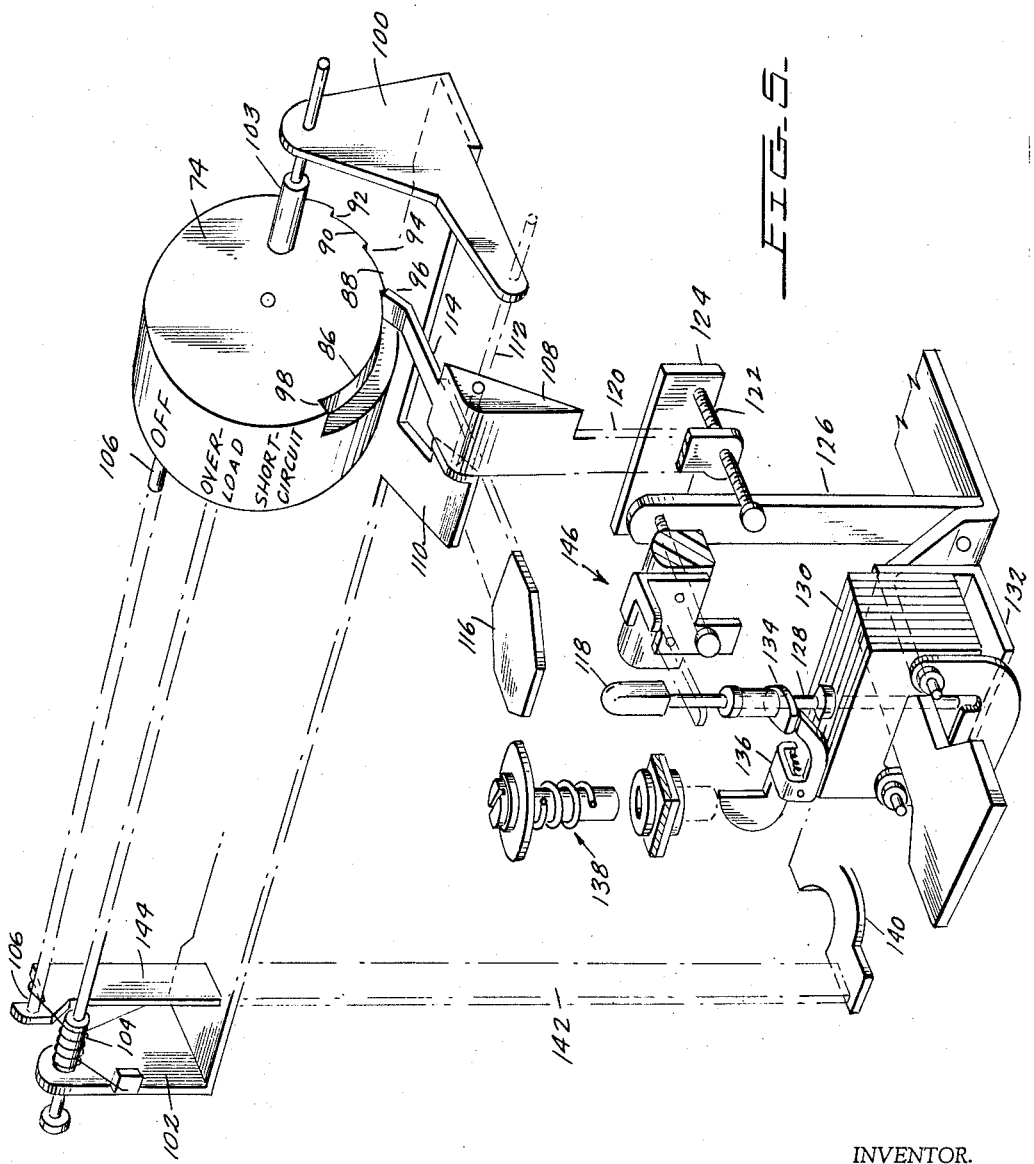
INVENTOR.
ELWOOD T. PLATZ
BY Ostrolenk, Faber,
Gerb & Soffen
ATTORNEYS

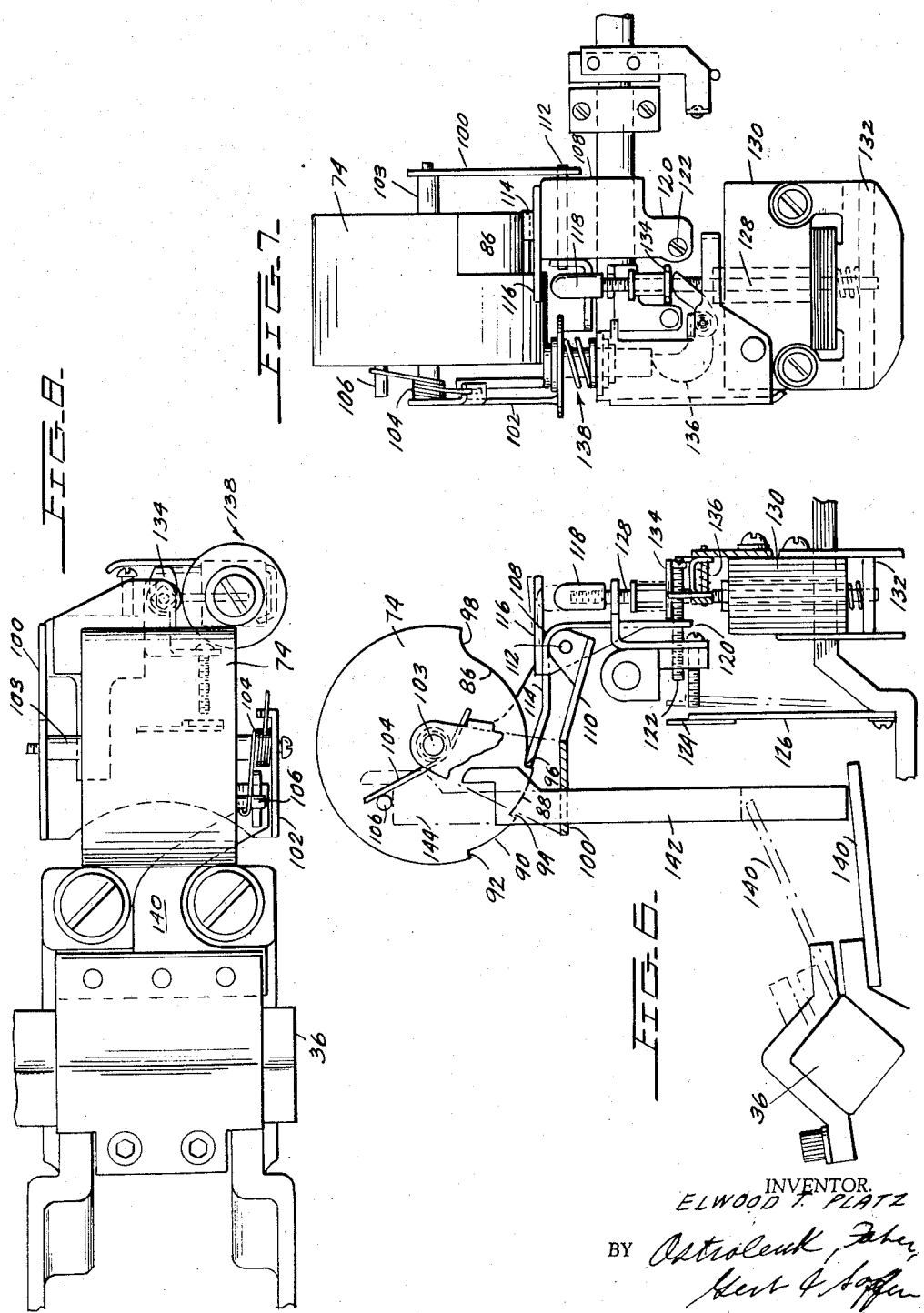

United States Patent Office 2,905,795
Patented Sept. 22, 1959

2,905,795

INDICATOR STRUCTURE FOR CIRCUIT BREAKERS

Elwood T. Platz, Detroit, Mich., assignor to I-T-E Circuit Breaker Company, Philadelphia, Pa., a corporation of Pennsylvania Application December 30, 1957, Serial No. 706,169

7 Claims. (Cl. 200—167)

My invention relates to an indicator structure for circuit breakers which indicates the contact conditions of a circuit breaker and the cause of automatic operation of the circuit breaker.

More specifically, my novel structure provides an indicating mechanism for indicating whether the circuit breaker is in an "on" or "off" condition, and if the circuit breaker is automatically operated, will indicate whether the operation was due to overload or short circuit conditions. When my novel structure is applied to a multiphase circuit breaker, there may be an indicator associated with each individual phase, thus showing which phase carried a fault to initiate the operation of the circuit breaker.

It is to be noted that my novel circuit breaker is of particular application in circuit breakers which are returned to an "off" or "reset" position responsive to a fault condition, since, in these devices, there is no way of knowing what type of fault caused the circuit breaker operation. With my novel indicator mechanism, however, the reason for operation, and the phase causing the operation will be immediately presented.

Accordingly, a primary object of my invention is to provide a novel indicating device for circuit breakers which will indicate what type of fault condition initiated circuit breaker operation.

Another object of my invention is to provide a novel indicating means for multiphase circuit breakers for indicating which phase of the circuit breaker is subjected to a fault, and what type of fault existed.

A further object of my invention is to provide a novel indicator mechanism which visually presents the circuit breaker contact position, and if the circuit breaker is operated by a fault condition, whether the fault was an overload, or a short circuit.

These and other objects of my invention will become apparent from the following description when taken in conjunction with the drawings in which:

Figure 2a shows a side cross-sectional view of the operating yoke of Figure 2.

Figure 3 is similar to Figure 1, and shows the multiphase circuit breaker with its cover and operating handle in place.

Figure 4 shows a side view of one phase of the circuit breaker of Figure 1, and particularly illustrates the current path therethrough.

Figure 4a shows a side cross-sectional view through one phase of the breaker of Figure 1 when in the "on" position.

Figure 5 shows an exploded perspective view of one of the indicating means associated with one phase of the circuit breaker of Figure 1.

Figure 6 shows a side view of the assembled structure of Figure 1.

Figure 7 shows a front view of Figure 6.

Figure 8 shows a top view of Figure 6.

Figures 1, 2:
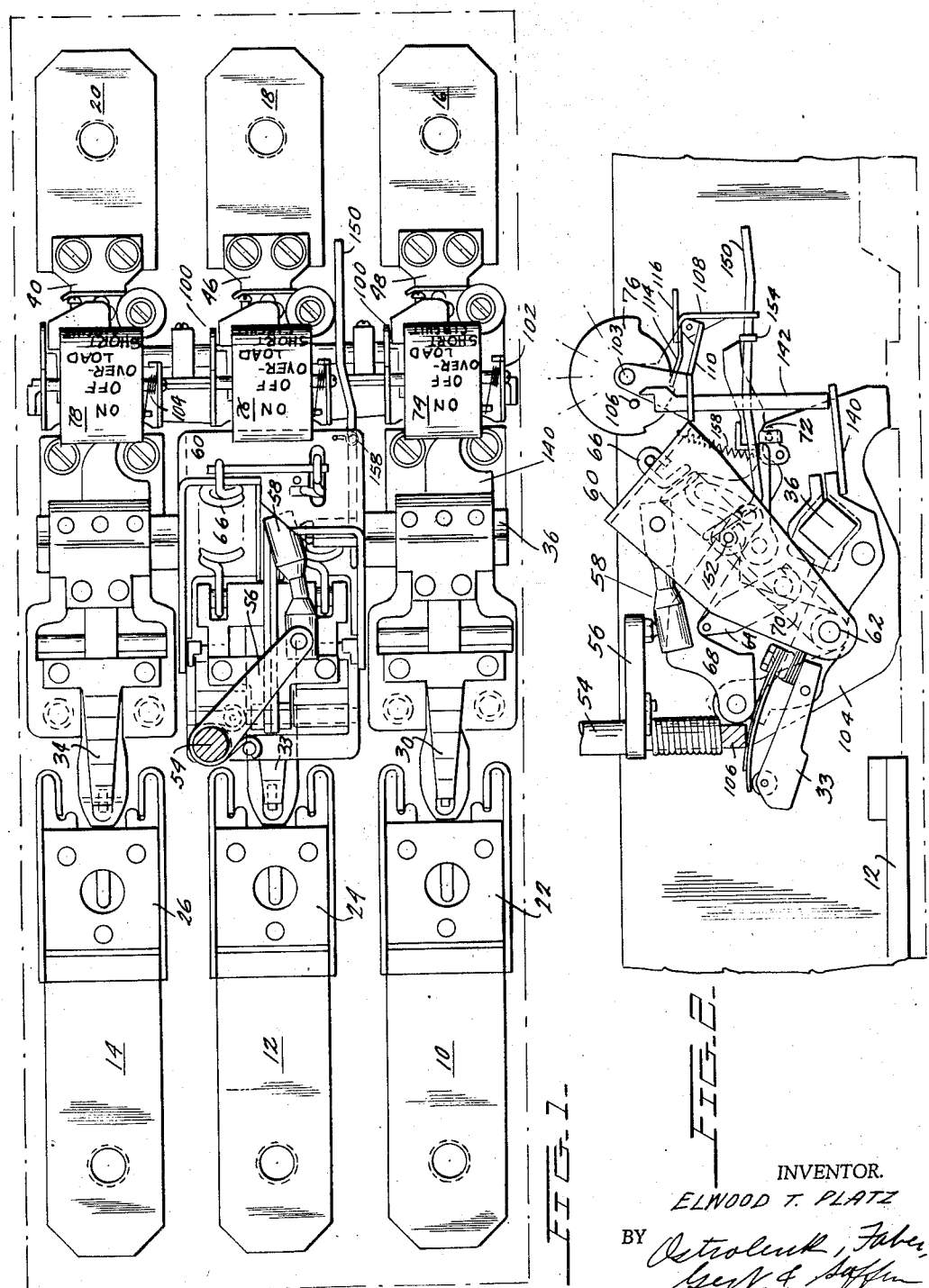
Figure 1 shows a top view of a multiphase circuit breaker equipped with my novel indicating structure with the top of the circuit breaker removed.
Figure 2 shows a side view of the operating toggle mechanism for the circuit breaker of Figure 1 when in the "off" position.

Referring now to the figures, Figures 1, 2a, 3, 4 and 4a set forth one type of circuit breaker to which my novel invention could be applied. It is to be noted that while the following description of my novel invention is made in conjunction with the specific circuit breaker of Figures 1 through 4, that any type circuit breaker which could be of either the single pole, or multipole type could be modified in accordance with the invention.

As shown in Figures 1 and 3, the circuit breaker is of three pole type having input line conductors 10, 12 and 14 for each respective pole and output load conductors 16, 18 and 20 respectively for the same respective poles. Each of line conductors 10, 12, and 14 are taken through arc chute means 22, 24, and 26 respectively and are terminated by a respective stationary contact such as contact 28 for the phase including line member 14 as seen in Figures 4 and 4a where Figures 4 and 4a are views of Figure 3 taken across lines 4—4. Each of the stationary contacts then cooperate with a respective movable contact such as movable contacts 30, 32 and 34 (Figure 1).

As best seen in Figures 1, 4 and 4a, each of the movable contacts are connected to a common operating bar 36 and are pivotally movable on bar 36 to be movable into and out of engagement with their cooperating stationary contact. The operating mechanism for operating the movable contacts will be set forth hereinafter in conjunction with Figures 2 and 2a.

As is best seen in Figure 4, each of movable contacts 30, 32, and 34 have a conductive pigtail such as pigtail 38 for stationary contact 34 connected thereto which leads to a stationary conductor such as conductor 40. The conductor 40 for the phase including movable contact 34 and the corresponding conductors of the other two phases then have a bimetal element associated therewith in thermal relationship, the bimetal for the phase shown in Figures 4 and 4a having bimetal element 42. Clearly, the bimetal elements of each of the phases operate as the overload trip elements for that phase.

The conductors, such as conductor 40 then continue through a magnetic structure such as magnetic structure 44 in Figures 4 and 4a which has an armature member associated therewith. This combination, as will be shown more fully hereinafter in conjunction with Figures 6 and 7, operates as the magnetic trip element for the circuit breaker, and operates responsive to short circuit currents in their respective phase.

As is then best seen in Figure 1, each of the conductors such as 40, and specifically, conductors 40, 46 and 48 for the highest, middle and lowest phase or pole respectively emerge from their respective magnetic trip units and are connected to load conductors 20, 18 and 16 respectively.

Accordingly, the current path for each pole is completed, and as best seen in Figure 4 for the case of the highest pole in Figures 1 and 3, is comprised of line conductor member 14, stationary contact 28, movable contact 34, pigtail 38, conductor 40, and line conductor member 20.

The circuit breaker of Figures 1 through 4 is manually operated from a rotary operating handle 50 seen in Figure 3, where, as shown by plaque 52, the operating handle is rotated counter-clockwise to open the contacts, and clockwise to close the contacts.

As is more fully described in copending application Serial No. 706,186, filed December 30, 1957, and assigned to the assignee of the instant invention, the operating handle 50 is secured to operating shaft 54 of Figures 1 and 4 which is seated in any desired manner in the casing of the circuit breaker. Shaft 54, as best seen in Figures 1, 2 and 4a has an extending crank arm 56 rigidly secured thereto which has its outer end secured in a ball and socket connection to one end of member 58. The other end of member 58 is secured in a second ball and socket connection to a member (not shown) which is fastened to an operating yoke 60 as best seen in Figures 2 and 2a.

Yoke 60 is pivotally supported about pivot point 62, and forms an operating toggle linkage with link 64 (Figure 2) and springs 66 where one end of toggle link 64 is positioned in a shoulder of latching cradle 68.

The toggle linkage is then connected to contact arm 33 through an intermediate link 70 which is pivotally connected at the junction between spring 66 and toggle link 64.

Since the construction of the above noted toggle mechanism is the subject of copending application Serial No. 728,937, filed April 16, 1958, and assigned to the assignee of the instant invention, reference is made thereto for details of its construction and operation. It is only necessary for purposes of the instant invention to understand that as the yoke 60 is laterally rotated counter-clockwise from the position of Figure 2 responsive to rotation of operating handle 50 to the position of Figure 2 whereby the movable contacts will snap to the engaged position. The contacts may then be disengaged either by opposite rotation of yoke 60, or by defeat of latch member 72 which normally latches cradle 68 in the position shown.

Automatic tripping of the circuit breaker can be achieved by operation of a common tripper bar 85 of Figure 4a to unlatch trip member 87 and thus the main trip latch 89 which latches cradle 68.

As best seen in Figures 1 and 3, each of the phases has an indicating cylinder 74, 76 and 78 respectively associated therewith (Figure 1) which cooperate with windows 80, 82 and 84 respectively (Figure 3) in cover 85 (Figure 4a) to present the appropriate contact indication to an observer. More specifically, each of the phase indicators can present either an "off," "on," "overload," or "short circuit" indication through their respective window. Furthermore, they can present conditions particular to their own respective phase. By way of example, in Figure 3, the circuit breaker has been tripped and a visual inspection clearly shows that the breaker operated automatically because of an overload on the lower phase.

The operation and structure of my novel indicator means is best understood from Figures 5, 6, 7 and 8 which specifically show indicator member 74 and its operating structure.

As seen in Figures 5 through 8, indicator member 74 is of a general drum shape and has three recesses 86, 88 and 90 therein of different radii to thereby form four shoulders 92, 94, 96 and 98.

Each drum indicator is individually pivotally mounted within an individual frame. Thus drum 74 is pivotally supported by brackets 100 and 102 which carry pivotal support member 103 which is fastened to the axial center of drum 74.

A light biasing spring 104 is carried by member 103 and has one end secured to support 102 as best seen in Figures 5, 7 and 8 and its other end engages protrusion 106 of drum 74 (Figures 6, 7 and 8) to bias drum 74 in a clockwise direction in Figure 5 corresponding to a counter-clockwise direction in Figure 6.

In order to appropriately position the various indicator drums, each drum is provided with an indicator trip lever such as indicator trip lever 108 of Figures 5 and 6 which is pivotally supported from extension 110 of the drum support frame by a pivotal mounting pin 112.

Each of the indicator trip levers such as indicator trip lever 108 is provided with a first extension 114 which cooperates with the various shoulders of drum 74 for positioning the drum in a predetermined manner, a second extension 116 which cooperates with the short circuit coil armature adjustment nut 118, and a third extension 120 which carries an adjusting screw 122 which cooperates with a lateral extension 124 of the overload trip bimetal 126 (which is similar to bimetal 42 of Figure 4).

As seen in Figures 5, 6 and 7, nut 118 terminates armature shaft 128 which passes through the U shaped magnetic core 130 (which corresponds to core 44 of Figure 4) and is attached to armature 132. Shaft 128 also carries a latch member 134 (Figures 5 and 7) which cooperates with a pivotally mounted latch member 136 which is biased into engagement with latch 134 by biasing structure 138 (Figure 5).

In operation, when a short circuit is conducted through conductor 48 of the lowest phase of Figure 1, and the phase under consideration in Figures 5 through 8, the armature 132 will be rapidly forced upwardly to thereby drive nut 118 and latch member 136 upwardly. Accordingly, latch 136 will be unlatched to allow the breaker to trip.

As best seen in Figures 1, 5, and 6, each of the phases is provided with an extension such as extension 140 for the phase including drum 74. Extension 140 is rigidly carried by movable contact pivotal member 36 and is positioned in the solid line position of Figure 6 when the contacts are open and the circuit breaker is "off," and is positioned in the dotted line position of Figure 6 when the contacts are closed and the circuit breaker is "on."

Each extension such as extension 140 cooperates with a suitably guided indicator link 142 which moves from the solid position of Figure 6 to the dotted position of Figure 6 when the contacts are moved from their disengaged and to their engaged position.

In so moving, the head 144 of link 142 will pick up pin 106 of drum 74 to drive the drum clockwise in Figure 6 and against the force of biasing spring 104.

The operation of my novel indicator system is as follows:

During the normal off position shown in Figures 5 through 8, extension 114 of member 108 is biased into engagement with shoulder 96 of depression 86 by the biasing spring 104. It is to be noted that light biasing means (not shown for purposes of clarity) bias member 108 counter-clockwise in Figure 5 so that extension 114 follows surface 86. In this position, the "off" marking of drum 74 is presented through its corresponding window 84 of Figure 3.

When the circuit breaker is manually operated to the "on" position, the member 36, and therefore its extension 140 will move to the dotted position of Figure 6 whereby link 142 is driven upward so that head 144 engages pin 106 of drum 74 to cause drum 74 to rotate counter-clockwise in Figure 5 and clockwise in Figure 6 against the force of biasing spring 104.

As a result of this rotation, the "on" indication of drum 74 will be presented through window 84 of Figure 3. Note that during this rotation that surface 86 continues to engage extension 114 but that extension 114 moves out of engagement with shoulder 96.

When the current through conductor 48 is of overload proportions, bimetal 126 will be warped to the dotted position of Figure 6 (to the left in Figure 5) overload trip mechanism 146 of Figure 5 will engage the end of bimetal arm 126 to operate arm 128 and thus allow unlatching of latch member 136 and tripping of the circuit breaker. This allows link 142 to drop so that drum 74 is free to rotate under the bias spring 104.

During the warping of the bimetal, lateral extension 124 will pick up screw 122 to thereby rotate member 108 against the force of its biasing means to depress extension 114 sufficiently to allow the end of extension 114 to clear shoulder 96. Accordingly, the drum will be rotated clockwise in Figure 5 until the end of extension 114 picks up shoulder 94 to thereby position the overload marker on drum 74 in its viewing window 84 of Figure 3.

Therefore, an observer can see that the circuit breaker tripped because of an overload on the phase including drum 74. Clearly, the other drums of the other phases will rotate to place their "off" marker in their respective windows since their respective bimetal did not rotate their respective trip link indicator to allow the first shoulder such as shoulder 96 to be cleared.

In the event of a short circuit current through conductor 48, the armature 132 and shaft 128 will be forcefully driven upward. This will cause a defeat of the latch member 136 so that link 142 is moved downwardly to allow rotation of drum 74 under the action of biasing spring 104.

The same upward movement of shaft 128 causes nut 118 to engage extension 116 to thereby depress extension 114 sufficiently (by properly adjusting nut 118) to allow the end of extension 114 to clear both of shoulders 96 and 94. Accordingly, biasing spring 104 will drive drum 74 until the end of extension 114 picks up shoulder 92 and the short circuit label of drum 74 moves into window 84 of Figure 3.

Clearly, the other drums of the other phases will move to their "off" position as was the case in overload operation.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. An indicator mechanism for a circuit breaker; said indicator mechanism comprising a rotatable drum having indicating markers for indicating overload operation and short circuit operation; means associated with said drum member for presenting a single one of said short circuit or overload markers at one time; said drum member being normally held in a first position; a first connecting means for operatively connecting said drum to an overload responsive means of said circuit breaker, and a second connecting means for operatively connecting said drum to a short circuit responsive means; said first connecting means rotating said drum from said normal position to a position where said overload indicating marker is presented responsive to overload conditions; said second connecting means rotating said drum from said normal position to a position where said short circuit indicating marker is presented responsive to short circuit conditions.

2. An indicator mechanism for a circuit breaker; said indicator mechanism comprising a rotatable drum having indicating markers for indicating overload operation and short circuit operation; means associaed with said drum member for presenting a single one of said short circuit or overload markers at one time; said drum member being normally held in a first position; a first connecting means for operatively connecting said drum to an overload responsive means of said circuit breaker, and a second connecting means for operatively connecting said drum to a short circuit responsive means; said first connecting means rotating said drum from said normal position to a position where said overload indicating marker is presented responsive to overload conditions; said second connecting means rotating said drum from said normal position to a position where said short circuit indicating marker is presented responsive to short circuit conditions; said drum having a first depression of a first radial dimension terminated by a first shoulder, and a second depression of a second radial dimension terminated by a second shoulder; each of said first and second connecting means being operatively connected to said drum through a common extension means biased to normally engage the surface of said drum movable away from the surface of said drum to permit said first and second shoulders to rotate therepast under the influence of said drum biasing means; said first connection means being operable to move said extension a first distance from said drum surface to permit engagement of said drum at one of said first or second shoulders; said second connecting means being operable to move said extension a second distance from said drum surface, to permit engagement of said drum at the other of said first or second shoulders; said overload indicator being displayed when said first shoulder is engaged, said short circuit indicator being displayed when said second shoulder is displayed.

3. An indicator mechanism for circuit breakers; said indicator mechanism comprising a rotatable member having indicating markers thereon for indicating the position of the contacts of said circuit breaker and the condition of the short circuit and overload trip units of said circuit breaker; means associated with said member for presenting a single indicating marker to visual attention; said rotatable member presenting each of said indicating markers responsive to rotation thereof past said presenting means; said rotatable member being normally biased and positioned to show a first indicating marker for indicating the "off" position of said circuit breaker contacts; a first, second and third connecting means for operatively connecting said rotatable member to a circuit breaker contact movement responsive means, an overload sensing means and a short circuit sensing means; said rotatable member being rotated to present an "on," overload or short circuit indicating marker responsive to operation of said circuit breaker contacts to an "on" position, an overload current, or a short circuit current respectively.

4. An indicator mechanism for circuit breakers; said indicator mechanism comprising a rotatable member having indicating markers thereon for indicating the position of the contacts of said circuit breaker and the condition of the short circuit and overload trip units of said circuit breaker; means associated with said member for presenting a single indicating marker to visual attention; said rotatable member presenting each of said indicating markers responsive to rotation thereof past said presenting means; said rotatable member being normally biased and positioned to show a first indicating marker for indicating the "off" position of said circuit breaker contacts; a first, second and third connecting means for operatively connecting said rotatable member to a circuit breaker contact movement responsive means, an overload sensing means and a short circuit sensing means; said rotatable member being rotated to present an "on," overload or short circuit indicating marker responsive to operation of said circuit breaker contacts to an "on" position, an overload current, or a short circuit current respectively; said rotatable member having a first, second and third depression forming a first, second and third respective shoulder of progressively larger radii, each of said second and third connecting means being operatively connected to said rotatable member through a common extension means biased to engage the surface of said rotatable member and engaging said first shoulder when said circuit breaker is "off" to oppose rotation of said rotatable member under the action of its said biasing means; said common extension means being movable away from the surface of said rotatable member to clear said first shoulder responsive to operation of one of said first or second connecting means to allow said rotatable member to rotate until said extension engages said second shoulder and to clear said second shoulder responsive to operation of the other of said first or second connecting means to allow said rotatable member to rotate until said extension engages said third shoulder.

5. An indicator mechanism for circuit breakers; said indicator mechanism comprising a rotatable member having indicating markers thereon for indicating the position of the contacts of said circuit breaker and the condition of the short circuit and overload trip units of said circuit breaker; means associated with said member for presenting a single indicating marker to visual attention; said rotatable member presenting each of said indicating markers responsive to rotation thereof past said presenting means; said rotatable member being normally biased and positioned to show a first indicating marker for indicating the "off" position of said circuit breaker contacts; a first, second and third connecting means for operatively connecting said rotatable member to a circuit breaker contact movement responsive means, an overload sensing means and a short circuit sensing means; said rotatable member being rotated to present an "on," overload or short circuit indicating marker responsive to operation of said circuit breaker contacts to an "on" position, an overload current, or a short circuit current respectively; said rotatable member having a first, second and third depression forming a first, second and third responsive shoulder of progressively larger radii, each of said second and third connecting means being operatively connected to said rotatable member through a common extension means biased to engage the surface of said rotatable member and engaging said first shoulder when said circuit breaker is "off" to oppose rotation of said rotatable member under the action of its said biasing means; said common extension means being movable away from the surface of said rotatable member to clear said first shoulder responsive to operation of one of said first or second connecting means to allow said rotatable member to rotate until said extension engages said second shoulder and to clear said second shoulder responsive to operation of the other of said first or second connecting means to allow said rotatable member to rotate until said extension engages said third shoulder; said first connecting means being operable to rotate said rotatable member from said normal "off" position and in a direction opposing the bias for said rotatable member to position said rotatable member in an "on" position.

6. An indicator mechanism for each phase of multiphase circuit breakers; said indicator mechanism comprising a rotatable member having indicating markers thereon for indicating the position of the contacts of said circuit breaker and the condition of the short circuit and overload trip units of said respective circuit breaker phase; means associated with said member for presenting a single indicating marker to visual attention; said rotatable member presenting each of said indicating markers responsive to rotation thereof past said presenting means; said rotatable member being normally biased and positioned to show a first indicating marker for indicating the "off" position of said circuit breaker contacts; a first, second and third connecting means for operatively connecting said rotatable member to a circuit breaker contact movement responsive means, an overload sensing means and a short circuit sensing means for said respective circuit phase; said rotatable member being rotated to present an "on," overload or short circuit indicating marker responsive to operation of said circuit breaker contacts to an "on" position, an overload current, or a short circuit current respectively in its said respective phase.

7. An indicator mechanism for each phase of multiphase circuit breakers; said indicator mechanism comprising a rotatable member having indicating markers thereon for indicating the position of the contacts of said circuit breaker and the condition of the short circuit and overload trip units of said respective circuit breaker phase; means associated with said member for presenting a single indicating marker to visual attention; said rotatable member presenting each of said indicating markers responsive to rotation thereof past said presenting means; said rotatable member being normally biased and positioned to show a first indicating marker for indicating the "off" position of said circuit breaker contacts; a first, second and third connecting means for operatively connecting said rotatable member to a circuit breaker contact movement responsive means, an overload sensing means and a short circuit sensing means for said respective circuit phase; said rotatable member being rotated to present an "on," overload or short circuit indicating marker responsive to operation of said circuit breaker contacts to an "on" position, an overload current, or a short circuit current respectively in its said respective phase; said rotatable member having a first, second and third depression forming a first, second and third respective shoulder of progressively larger radii, each of said second and third connecting means being operatively connected to said rotatable member through a common extension means biased to engage the surface of said rotatable member and engaging said first shoulder when said circuit breaker is "off" to oppose rotation of said rotatable member under the action of its said biasing means; said common extension means being movable away from the surface of said rotatable member to clear said first shoulder responsive to operation of one of said first or second connecting means to allow said rotatable member to rotate until said extension engages said second shoulder and to clear said second shoulder responsive to operation of the other of said first or second connecting means to allow said rotatable member to rotate until said extension engages said third shoulder.

References Cited in the file of this patent

UNITED STATES PATENTS

| 2,222,312 | Green | Nov. 19, 1940 |
| 2,685,011 | Boller et al. | July 27, 1954 |
| 2,811,618 | Cole et al. | Oct. 29, 1957 |